United States Patent
Ruberg et al.

(10) Patent No.: US 6,538,668 B1
(45) Date of Patent: Mar. 25, 2003

(54) DISTRIBUTED SETTINGS CONTROL PROTOCOL

(75) Inventors: Alan Ruberg, Foster City, CA (US); James G. Hanko, Redwood City, CA (US); Benjamin H. Stoltz, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/289,794

(22) Filed: Apr. 9, 1999

(51) Int. Cl.[7] .............. G06F 3/00; G06F 15/16; G06F 17/30
(52) U.S. Cl. ............ 345/747; 345/735; 345/740; 345/744; 709/220
(58) Field of Search ............... 345/163, 698, 345/733, 735, 736, 740, 744, 746, 747, 762, 765, 778; 709/201, 203, 217, 220, 221, 223

(56) References Cited

U.S. PATENT DOCUMENTS

| | | | | |
|---|---|---|---|---|
| 6,044,465 A | * | 3/2000 | Dutcher et al. | 713/200 |
| 6,047,288 A | * | 4/2000 | Kurosawa et al. | 707/9 |
| 6,065,041 A | * | 5/2000 | Lum et al. | 709/203 |
| 6,085,244 A | * | 7/2000 | Wookey | 709/223 X |
| 6,131,116 A | * | 10/2000 | Riggins et al. | 709/203 X |
| 6,161,176 A | * | 12/2000 | Hunter et al. | 713/1 |
| 6,182,212 B1 | * | 1/2001 | Atkins et al. | 713/1 |
| 6,237,022 B1 | * | 5/2001 | Bruck et al. | 709/201 |
| 6,237,092 B1 | * | 5/2001 | Hayes, Jr. | 709/221 X |
| 6,247,128 B1 | * | 6/2001 | Fisher et al. | 713/100 |
| 6,304,895 B1 | * | 10/2001 | Schneider et al. | 709/203 |
| 6,374,237 B1 | * | 4/2002 | Reese | 707/3 |

* cited by examiner

Primary Examiner—Ba Huynh
Assistant Examiner—X. L. Bautista
(74) Attorney, Agent, or Firm—O'Melveny & Myers LLP

(57) ABSTRACT

A distributed settings control protocol. One or more embodiments of the invention provide the ability for an application running on a server across a network to modify various settings related to the terminals such as display resolution, audio output configuration (such as volume control or headphones v. speaker), and energy saver procedures. These abilities are provided by adhering to several protocol properties. One or more embodiments may include but are not limited to the following properties: (1) a terminal maintains knowledge regarding which applications are currently viewing or accessing the terminal; (2) applications/programs and servers know the state of terminal settings (referred to as idempotence and consistency); (3) to modify a setting a server provides the correct current setting to the terminal prior to the terminal completing a change (referred to as locking compliance), (4) the settings are mobile from one terminal to another; (5) the settings on each terminal are independent of other terminals to provide for differences between terminal models and hardware (referred to as model independence); and (6) a user, a third party agent, a manufacturer, or other entity is permitted to set any desired policy related to the settings (referred to as policy free). By adhering to the above properties, the protocol of one or more embodiments ensures that settings are maintained accurately and consistently across a network while permitting multiple entities to modify and configure the settings.

37 Claims, 6 Drawing Sheets

DISTRIBUTED SETTINGS CONTROL PROTOCOL

BACKGROUND OF THE INVENTION

1. Field of the Invention

This invention relates to the field of computer settings and computer networks, and, more specifically, to the modification of a network computer's settings.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

In a computer network environment, a software application or a user at a computer terminal may desire computer settings (such as the audio volume control, the mouse pointer speed, or display resolution) to be configured in a specific manner. Further, a user may desire to change the computer terminal that the user is working at (e.g., to display something on a coworker's terminal) and still retain the previous settings at the new terminal. An application (that may be running on a "server" that executes applications remotely) may utilize the user's settings (e.g., to play a compact disk or a display a sequence of colors). To accommodate a change in terminals and for applications to modify settings, applications that access the settings need to be informed when a setting changes. Additionally, some settings may be related to each other and changes to related settings should be made simultaneously (e.g., the red component of a display, the blue component of a display, and the green component of a display (RGB values)). Prior art mechanisms do not provide the ability to modify settings across a network. Additionally, prior art mechanisms do not provide a method to inform relevant applications of any changes, or to simultaneously modify related settings.

To provide a better understanding of the invention, a description of networks is useful.

Networks

In modern computing environments, it is commonplace to employ multiple computers or workstations linked together in a network to communicate between, and share data with, network users (also referred to as "clients"). A network also may include resources, such as printers, modems, file servers, etc., and may also include services, such as electronic mail.

A network can be a small system that is physically connected by cables (a local area network or "LAN"), or several separate networks can be connected together to form a larger network (a wide area network or "WAN"). Other types of networks include the internet, telecommunication networks, the World Wide Web, intranets, extranets, wireless networks, and other networks over which electronic, digital, and/or analog data may be communicated.

Computer systems sometimes rely on a server computer system (referred to as a "server") to provide information to requesting computers on a network. When there are a large number of requesting computers, it may be necessary to have more than one server computer system to handle the requests.

SUMMARY OF THE INVENTION

A distributed settings control protocol. One or more embodiments of the invention provide for human interface devices (HIDs) or terminals connected to one or more server computers. The HIDs are configured to display data, and to send keyboard, cursor, audio, and video data through the network to the processing server. Functionality is partitioned so that databases, servers and graphical user interface functions are provided by the servers. One or more embodiments of the invention provide the ability for an application running on a server across a network or a HID itself to modify various settings related to the HIDs such as display resolution, audio output configuration (such as volume control or headphones v. speaker), and energy saver procedures.

One or more embodiments provide the ability to permit applications and third parties to configure settings over a network. In accordance with one or more embodiments, several protocol properties are adhered to. For example, one or more embodiments may include but are not limited to the following properties: (1) a HID maintains knowledge regarding which applications are currently viewing or accessing the HID; (2) applications/programs and servers know the state of HID settings (referred to as idempotence and consistency); (3) to modify a setting, a server provides the correct current setting to the HID prior to the HID completing a change (referred to as locking compliance); (4) the settings are mobile from one HID to another; (5) the types of settings on each HID are independent of other HIDs to provide for differences between HID models and hardware (referred to as model independence); and (6) a user, a third party agent, a manufacturer, or other entity is permitted to set any desired policy related to the settings (referred to as policy free).

By adhering to the above properties, the protocol of one or more embodiments ensures that settings are maintained accurately and consistently across a network while permitting multiple entities to modify and configure the settings.

DETAILED DESCRIPTION OF THE INVENTION

Figure 1:
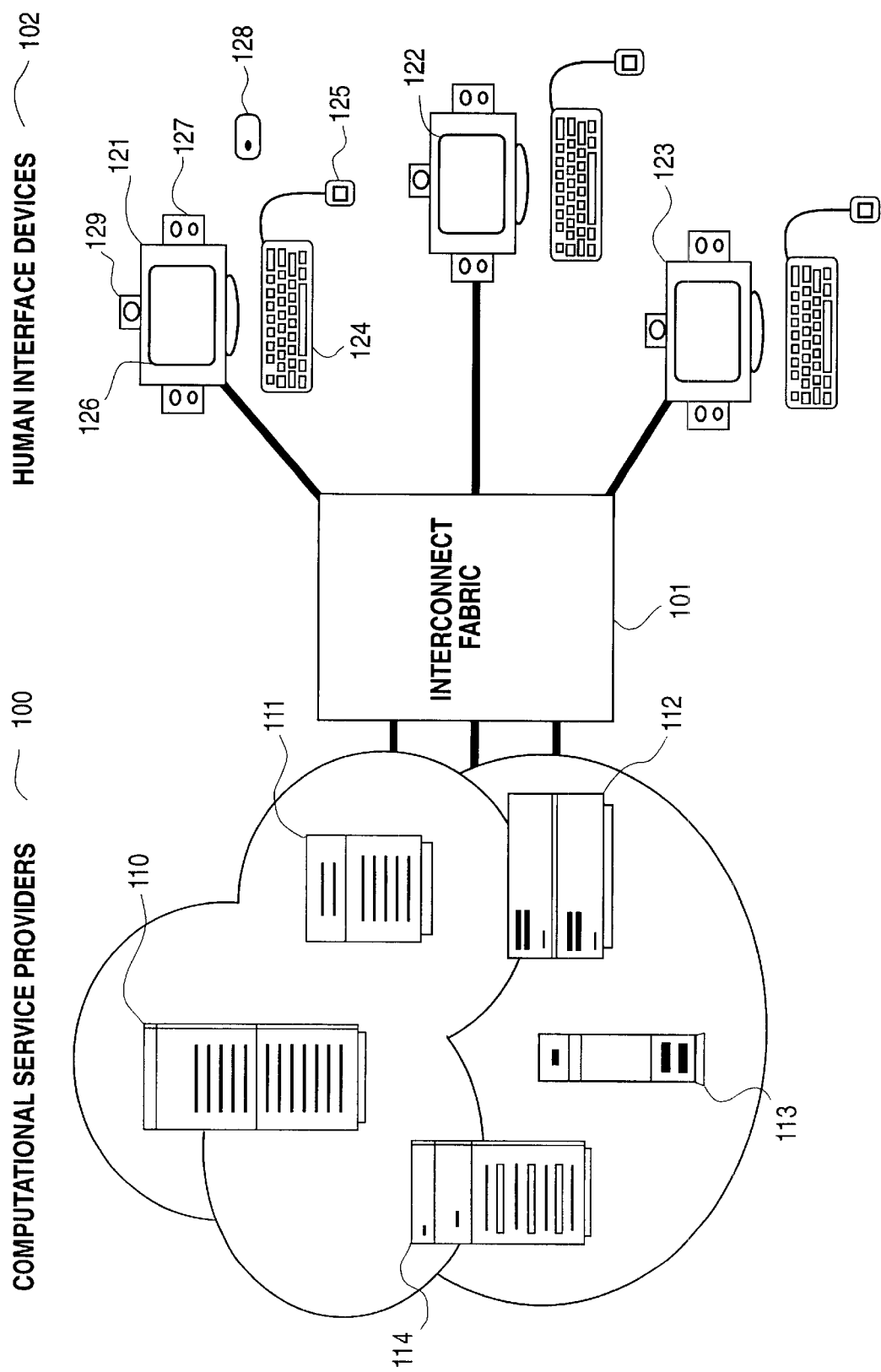
FIG. 1 illustrates communication between HIDs and services according to one or more embodiments of the invention.

The invention is a distributed setting control protocol. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Computer Network Embodiment

As described above, a computer network includes multiple computers linked together via a communication medium that allows them to interconnect and interact with one another. According to one or more embodiments of the invention, this communication medium is sometime referred to as the interconnect fabric and includes the physical paths and the communication protocols required for transporting data to and from the computers. A client/server network model includes one or more main computers (servers) that manage the transfer of data in the network and that can serve the request submitted by other computers (clients) in the network.

One or more embodiments of the invention comprise a client/server computer architecture having one or more client computers or "human interface devices (HID)" or "terminals" in a network with one or more server computers. A HID has the task of displaying output of services to a user and obtaining input to services from the user. A HID has the ability to respond to a command (e.g., display command) received from, for example, a software program executing on a computational service provider. The input received from a user is forwarded to, for example, a service that is fulfilling a user request. A service is a program that performs some function for a user. More than one server can execute the services that comprise a session.

One or more embodiments of the invention provide a central office metaphor to computing, where services of one or more servers are provided to a HID or terminal through a network, such as ethernet. The HIDs are configured to display data, and to send keyboard, cursor, audio, and video data through the network to the processing server. Functionality is partitioned so that databases, servers and graphical user interface functions are provided by the services, and human interface functionality is provided by the HIDs. Communication with the HIDs from various services is accomplished by converting disparate output to a common protocol. Appropriate drivers are provided for each service to allow protocol conversion.

In one or more embodiments of the invention, multiple HIDs are coupled to the network. Users can enable a unique session at any one of the HIDs by inserting a "smart card" into a card reader. A smart card is a card that is capable of storing information, for example in a magnetic strip or memory of the smart card. A session is a long-lived, persistent and reliable representation of those services which are executing on behalf of a user at any point in time. Removing the card disables the session. Re-inserting the card into the same or any other HID re-enables the session. Thus, a user can use any HID on the network to access the resources and services used or available to the user by enabling a session.

The present invention provides a new computer system architecture referred to as the virtual desktop architecture. This system offers substantially greater levels of functionality at a lower cost than prior art systems. The invention provides for a re-partitioning of functionality between a central server installation and the user hardware. Data and computational functionality are provided by data sources via a centralized processing arrangement. At the user end, functionality is eliminated except that which generates output to the user (e.g. display and speakers), takes input from the user (e.g. mouse and keyboard) or other peripherals that the user may interact with (e.g. scanners, cameras, removable storage, etc.).

Computing is done by the central data source and the computation is done independently of the destination of the data being generated. The output of the data source is provided to a HID or terminal. Each HID is capable of receiving the data and displaying the data.

The virtual desktop system architecture of the present invention may be analogized to other highly partitioned systems. For example, a public telephone company maintains powerful and sophisticated processing power and large databases at central offices. However, the HID, the telephone, is relatively simple and does not require upgrading when new features or services are added by the telephone company. The telephone itself becomes an appliance of low cost and extremely low obsolescence. Similarly, the display monitor of most computer systems has low obsolescence, and is typically retained through most desktop system upgrades.

Virtual Desktop System Architecture

In this system the functionality of the system is partitioned between a display and input device, and data sources or services. The display and input device is a HID. The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 1. Referring to FIG. 1, the system consists of computational service providers 100 communicating data through interconnect fabric 101 to HIDs 102.

Computational Service Providers

In the HID system, the computational power and state maintenance is found in the service providers, or services. The services are not tied to a specific computer, but may be distributed over one or more traditional desktop systems such as described in connection with FIG. 1, or with traditional servers. One computer may have one or more services, or a service may be implemented by one or more computers. The service provides computation, state, and data to the HIDs and the service is under the control of a common authority or manager. In FIG. 1, the services are found on computers 110, 111, 112, 113, and 114. It is important to note that the central data source can also be providing data that comes from outside of the central data source, such as for example, the internet or world wide web. The data source could also be broadcast entities such as those that broadcast data such as television or radio signals.

Examples of services include Java™ program execution services, X11/Unix services, archived or live audio or video services, Windows NT service, and others. A service herein is a process that provides output data and responds to user requests and input.

It is the responsibility of the service to handle communications with the HID that is currently being used to access the given service. This involves taking the output from the computational service and converting it to a standard protocol for the HID. This data protocol conversion is handled in one embodiment of the invention by a middleware layer, such as the a variant of the java.awt.graphics class, the X11 server, the Microsoft Windows interface, a video format transcoder, the OpenGL interface, or within the service producer machine. The service machine handles the translation to and from the virtual desktop architecture wire protocol.

In an embodiment of the invention, each service is provided by a computing device optimized for its performance. For example, a Sun MediaCenter could be used to provide video service, an Enterprise class machine could be used to provide X11/Unix service, a Hydra based NT machine could provide applet program execution service.

The service producing computer systems connect directly to the HIDs through the interconnect fabric. It is also possible for the service producer to be a proxy for another device providing the computational service, such as a database computer in a three tiered architecture, where the proxy computer might only generate queries and execute user interface code.

Interconnection Fabric

In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

In one embodiment of the invention, the interconnect fabric provides actively managed, low-latency, high-bandwidth communications between the HID and the services being accessed. One embodiment contemplates a single-level, switched network, with cooperative (as opposed to competing) network traffic. Dedicated or shared communications interconnects may be used in the present invention.

Human Interface Devices (HIDs)

The HID is the means by which users access the computational services provided by the servers or services, and as such the HID may also be referred to as a client or user workstation or terminal. FIG. 1 illustrates HIDs 121, 122, and 123. A HID may consist of a display 126, a keyboard 124, mouse 125, and audio speakers 127. The HID includes the electronics need to interface these devices to the interconnection fabric and to transmit to and receive data from the services.

Figure 2:
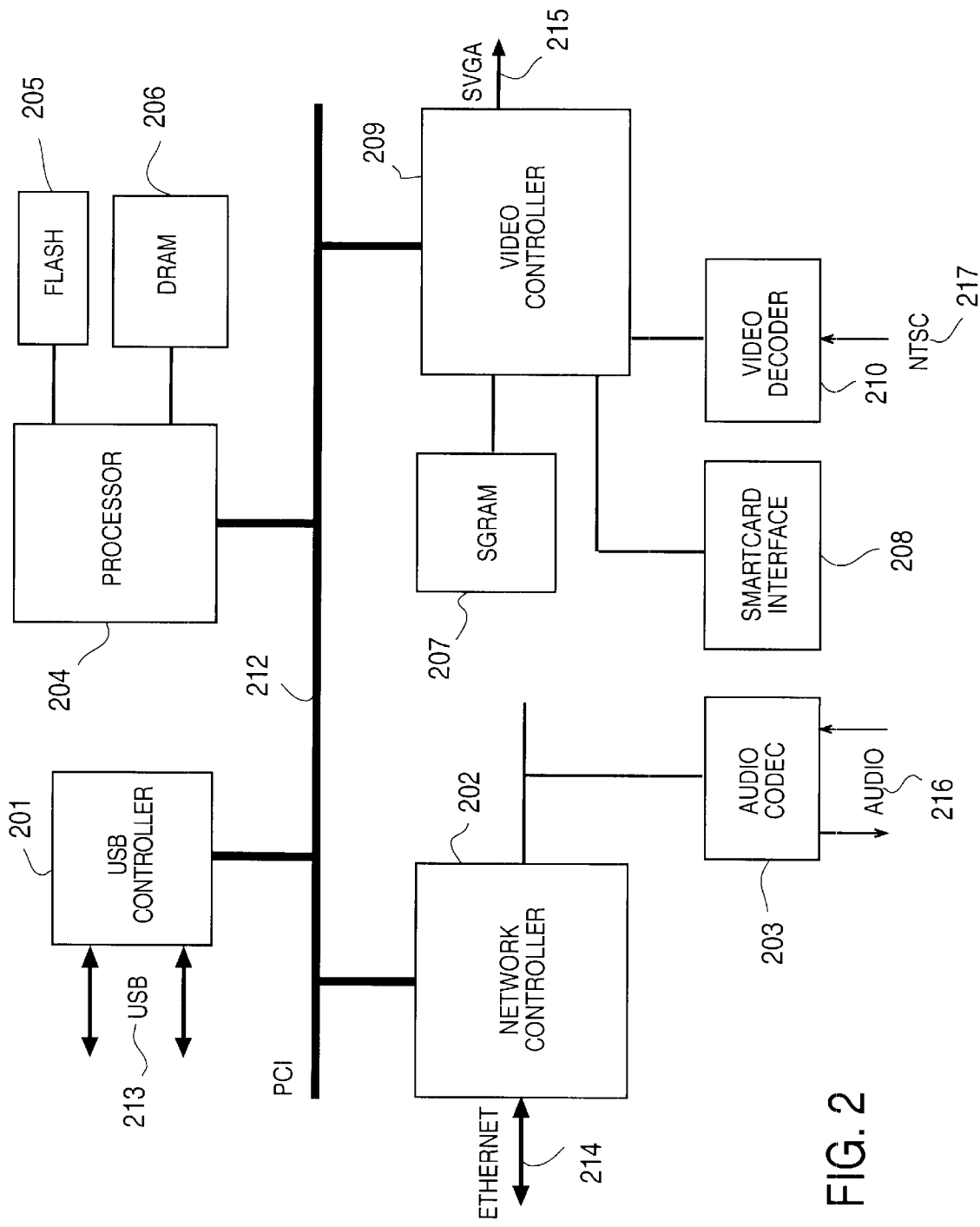
FIG. 2 is a block diagram of a HID according to one or more embodiments of the invention.

A block diagram of one emobidment of a HID is illustrated in FIG. 2. The components of the HID are coupled internally to a PCI bus 212. A network control block 202 communicates to the interconnect fabric, such as an ethernet, through line 214. An audio codec 203 receives audio data on interface 216 and is coupled to block 202. USB data communication is provided on lines 213 to USB controller 201.

An embedded processor 204 may be, for example, a Sparc2ep with coupled flash memory 205 and DRAM 206. The USB controller 201, network controller 202 and embedded processor 204 are all coupled to the PCI bus 212. Also coupled to the PCI 212 is the video controller 209. The video controller 209 may be for example, and ATI Rage128 frame buffer controller (or any other suitable controller) that provides SVGA output on line 215. NTSC or PAL data is provided into the video controller through video decoder 210. A smartcard interface 208 may also be coupled to the video controller 209.

Alternatively, the HID can be implemented using a single chip solution including the necessary processing capability.

This architecture or system is described in greater detail in U.S. Pat. application Ser. No. 09/063,335, assigned to the present assignee, filed Apr. 20, 1998, entitled (Method and Apparatus for Providing a Virtual Desktop System Architecture" which is hereby fully incorporated by reference.

Figure 3:
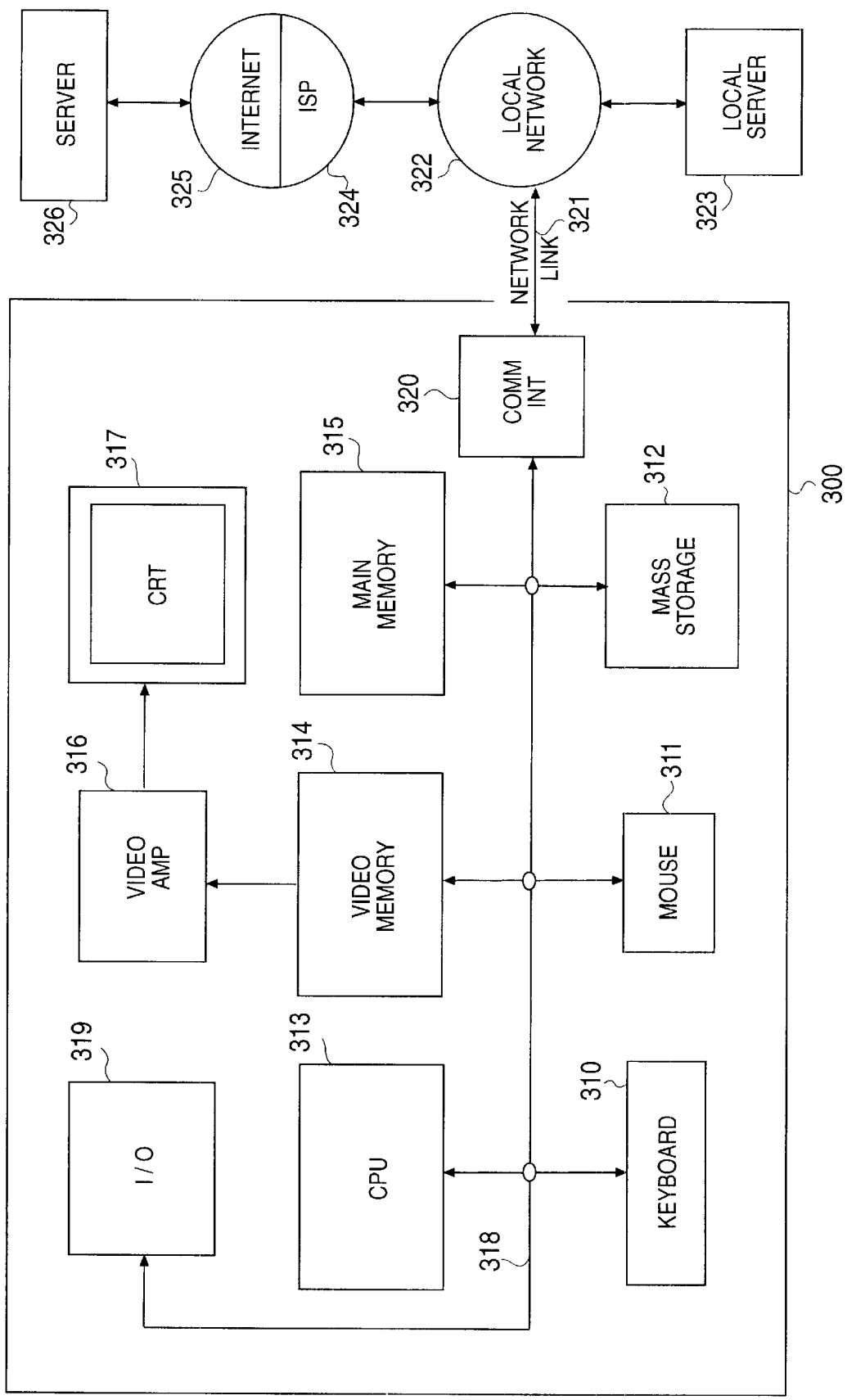
FIG. 3 is a block diagram of an embodiment of a computer system capable of providing a suitable execution environment for one or more embodiments of the invention.

An embodiment of the invention can be implemented as computer software in the form of computer readable code executed on a general purpose computer such as computer 300 illustrated in FIG. 3, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 310 and mouse 311 are coupled to a system bus 318. The keyboard and mouse are for introducing user input to the computer system and communicating that user input to processor 313. Other suitable input devices may be used in addition to, or in place of, the mouse 311 and keyboard 310. I/O (input/output) unit 319 coupled to system bus 318 represents such I/O elements as a printer, A/V (audio/video) I/O, etc.

Computer 300 includes a video memory 314, main memory 315 and mass storage 312, are coupled to system bus 318 along with keyboard 310, mouse 311 and processor 313. The mass storage 312 may include both fixed and removable media, such as magnetic, optical or magnetic optical storage systems or any other available mass storage technology. Bus 318 may contain, for example, thirty-two address lines for addressing video memory 314 or main memory 315. The system bus 318 also includes, for example, a 64-bit data bus for transferring data between and among the components, such as processor 313, main memory 315, video memory 314 and mass storage 312. Alternatively, multiplex data/address lines may be used instead of separate data and address lines.

In one embodiment of the invention, the processor 313 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 315 is comprised of dynamic random access memory (DRAM). Video memory 314 is a dual-ported video random access memory. One port of the video memory 314 is coupled to video amplifier 316. The video amplifier 316 is H used to drive the cathode ray tube (CRT) raster monitor 317. Video amplifier 316 is well known in the art and may be implemented by any suitable apparatus. This circuitry converts pixel data stored in video memory 314 to a raster signal suitable for use by monitor 317. Monitor 317 is a type of monitor suitable for displaying graphic images.

Computer 300 may also include a communication interface 320 coupled to bus 318. Communication interface 320 provides a two-way data communication coupling via a network link 321 to a local network 322. For example, if communication interface 320 is an integrated services digital network (ISDN) card or a modem, communication interface 320 provides a data communication connection to the corresponding type of telephone line, which comprises part of network link 321. If communication interface 320 is a local area network (LAN) card, communication interface 320 provides a data communication connection via network link 321 to a compatible LAN. Wireless links are also possible. In any such implementation, communication interface 320 sends and receives electrical, electromagnetic or optical signals which carry digital data streams representing various types of information.

Network link 321 typically provides data communication through one or more networks to other data devices. For example, network link 321 may provide a connection through local network 322 to local server computer 323 or to data equipment operated by an Internet Service Provider (ISP) 324. ISP 324 in turn provides data communication services through the world wide packet data communication network now commonly referred to as the "Internet" 325. Local network 322 and Internet 325 both use electrical, electromagnetic or optical signals which carry digital data streams. The signals through the various networks and the signals on network link 321 and through communication interface 320, which carry the digital data to and from computer 300, are exemplary forms of carrier waves transporting the information.

Computer 300 can send messages and receive data, including program code, through the network(s), network link 321, and communication interface 320. In the Internet example, remote server computer 326 might transmit a requested code for an application program through Internet 325, ISP 324, local network 322 and communication interface 320.

The received code may be executed by processor 313 as it is received, and/or stored in mass storage 312, or other non-volatile storage for later execution. In this manner, computer 300 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

By reducing the desktop unit's function to a well-defined, fixed, set of behaviors, a range of different implementations become possible. For example the HID could be implemented purely in hardware (e.g. as a board or a chip), it could be implemented as software that controls a small desktop system (e.g. a network computer, personal computer, traditional desktop system), or it could be implemented as an application running on a prior art workstation computer system.

Computing is done by the central data source and the computation is done independently of the destination of the data being generated. The output of the data source is provided to a HID. Each HID is capable of receiving the data and displaying the data.

Distributed Settings Control Protocol

One or more embodiments of the invention utilize a protocol to configure and maintain settings. The protocol enables multiple settings to be made relatively simultaneously, and when any modifications are made to the settings, the protocol updates programs that may access or utilize relevant settings. By utilizing the protocol, a user may switch HIDs and utilize the settings previously configured without any additional effort or actions by the user.

Figure 4:
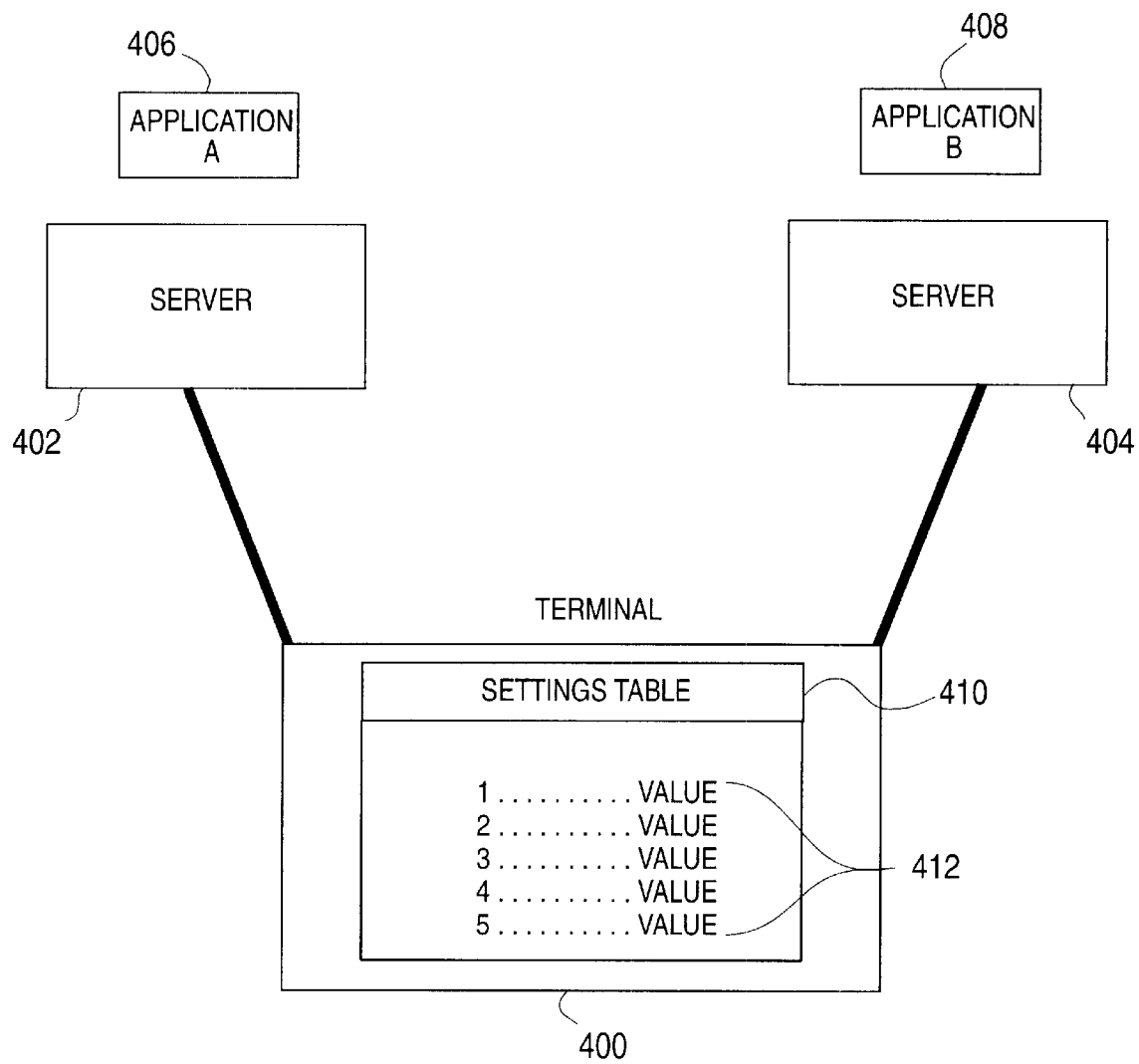
FIG. 4 illustrates the relationship between applications, servers, and a HID according to one or more embodiments of the invention.

FIG. 4 illustrates the relationship between applications, servers, and a terminal (or HID) according to one or more embodiments of the invention. A user may utilize terminal 400. Terminal 400 receives communications from server 402 and server 404 which may be executing zero or more applications/programs each (e.g., Application A 406 and Application B 408). Terminal 400 may contain settings table 410 that contains values for various settings 412.

Applications 406 and 408 may utilize and configure one or more settings 412. For example, Application A 406 may be a communication application and may turn off the volume setting (e.g., setting 1) once a modem establishes a connection with a fax machine or internet provider. Similarly, application B 408 may be a video game and may configure the display resolution of terminal 400 in a particular manner. Since both Application A 406 and Application B 408 are communicating with terminal 400, both applications use settings 412. Further, a setting may be modified by independently from either Application A 406 or Application B 408. For example, a user may modify the volume control on terminal 400. Consequently, if a setting changes (by an application or otherwise), servers 402 and 404 and the respective applications 406 and 408 are informed of the changed setting. For example, if Application A 406 changes setting 2 (e.g., to Value'), terminal 400 is updated with the new value of setting 2. However, Application B 408 still thinks that setting 2 is the old value since it has not been notified of any change. According to one or more embodiments of the invention, terminal 400 returns new settings to applications/programs viewing terminal 400. Consequently, terminal 400 would notify Application A 406 and Application B 408 of the change to setting 2. Thus, if one application changes a terminal setting such as volume control/balance, mouse speed/acceleration, display resolution, or energy saver features, applications are notified of the change.

Properties for Distributed Control Settings Protocol

One or more embodiments of the invention set forth a protocol consisting of several properties that are complied with. Adherence to the protocol properties enables applications to configure settings and ensures applications have uniform and consistent settings. In one or more embodiments, one or more of the following properties (which are described in detail below) are adhered to: (1) knowledge of viewers; (2) idempotence and consistency; (3) locking compliance; (4) mobility; (5) model independence; (6) policy free; (7) report hardware events; and (8) read-only (1) Knowledge of Viewers One property is that terminal 400 maintains the knowledge regarding which application(s) are currently viewing the terminal. For example, in FIG. 4, terminal 400 maintains the knowledge that both Application A 406 and Application B 408 are currently viewing terminal 400. To accommodate this property, one or more embodiments of the invention may require each program that modifies a setting to register with the system registry or terminal registry that tracks registered programs. Consequently, each program has a virtual connection with each terminal it is communicating with based on each terminal it is registered with. In a multicasting environment (e.g., an environment wherein a message may be transmitted to multiple recipients at the same time) each application may register with a multicast group, the registered programs are not tracked, and any setting change is broadcast to members of the multicast group and any interested applications/programs in the group can view the settings.

(2) Idempotence and Consistency

One property is that of idempotence (also referred to as transactability) and consistency. This property provides that programs/servers maintain knowledge of settings. Consequently, programs and servers are consistent with respect to the settings. To ensure that settings and views of the settings are consistent between applications, the settings are sent to applications viewing the terminal any time a change is completed. Consequently, even if only one setting is modified, all of the settings may still be transmitted to the applications. Idempotence refers to the property that a program can confirm that the system (e.g., each terminal being viewed) is in a particular state (e.g., 11 settings on the terminals) at once. To maintain idempotence and consistency, when any setting is modified, information is transmitted to the servers and programs.

Referring to FIG. 4, server 402, server 404, Application A 406, and Application B 408 maintain knowledge of the current settings 412. If setting 2 on terminal 400 were changed by Application A 406, server 402, server 404, and Application B 408 are informed of the changed setting. This way, server 402, server 404, Application A 406, and Application B 408 have the same consistent information at once.

(3) Locking Compliance

One property is that terminals adhere to the same locking policy with regards to the settings. In accordance with this property, one or more embodiments of the invention require that each application adheres to a particular locking algorithm. A locking algorithm protects the settings so that a setting modification is completed accurately and so that any related settings are modified simultaneously (or prior to any other modifications). To prevent errors on a terminal and in applications that utilize particular settings, relating settings are modified simultaneously or prior to any other modifications. If related settings are not modified simultaneously (or prior to any other modifications), then one setting may be modified and prior to completion of the related modification, the original setting may be modified by another application. Consequently, the related settings are not configured properly and may result in application or terminal errors.

In one or more embodiments of the invention, the locking algorithm utilizes a procedure/protocol referred to as test-and-set. In a test-and-set procedure/protocol, the current value is tested or compared to a stated value, and if there is match, the setting is completed (e.g., the new value is set). To adhere to a test-and-set procedure, an application provides the current setting value(s) and the new setting value (s) prior to a terminal implementing a change. For example, suppose that Application A 402 desires to change setting 3 to "a". To ensure that Application A 402 is aware of the most current setting value for setting 3, when the modification request is issued by Application A 402, Application A 402 supples the current setting value and the new setting value to terminal 400. Thus, if the current setting for setting 3 is "x" and Application A 402 requests a change stating that setting 3 is "y", terminal 400 will deny the modification request. When an application provides an incorrect setting value, it likely means that the application has not been informed of the most recent change. Similarly, if Application A 402 provides that the current value for setting 3 is "x", terminal 400 will execute the desired modification.

To illustrate the use of the locking algorithm., suppose that Application A 402 desires to change setting 3 from "x" to "a" and that Application B 404 desires to change setting 3 from "x" to "b". Both Application A 402 and Application B 404 issue requests to change setting 3 from "x" to the new value. Terminal 400 does not receive requests simultaneously but serially. Consequently, suppose that terminal 400 receives the modification request from Application A 402 first. Terminal 400 compares the current setting value for setting 3 (e.g., "x") to the stated value from Application A 402 ("x"). Since the values match, terminal 400 will complete the modification request and change setting 3 from "x" to "a". Next, the request from Application B 404 is received by terminal 400. Terminal 400 compares the current value (e.g., "a") to the stated value ("x") and determines that they do not match. Since the values do not match, terminal 400 will reject the requested modification by Application B 404 and Application B 404 may be notified accordingly. Application B 404 may be notified of the failed modification request by terminal 400 returning the current value (e.g., "a"). Application B 404 will know that the request failed upon receiving a setting value different from the value requested.

Figure 5:
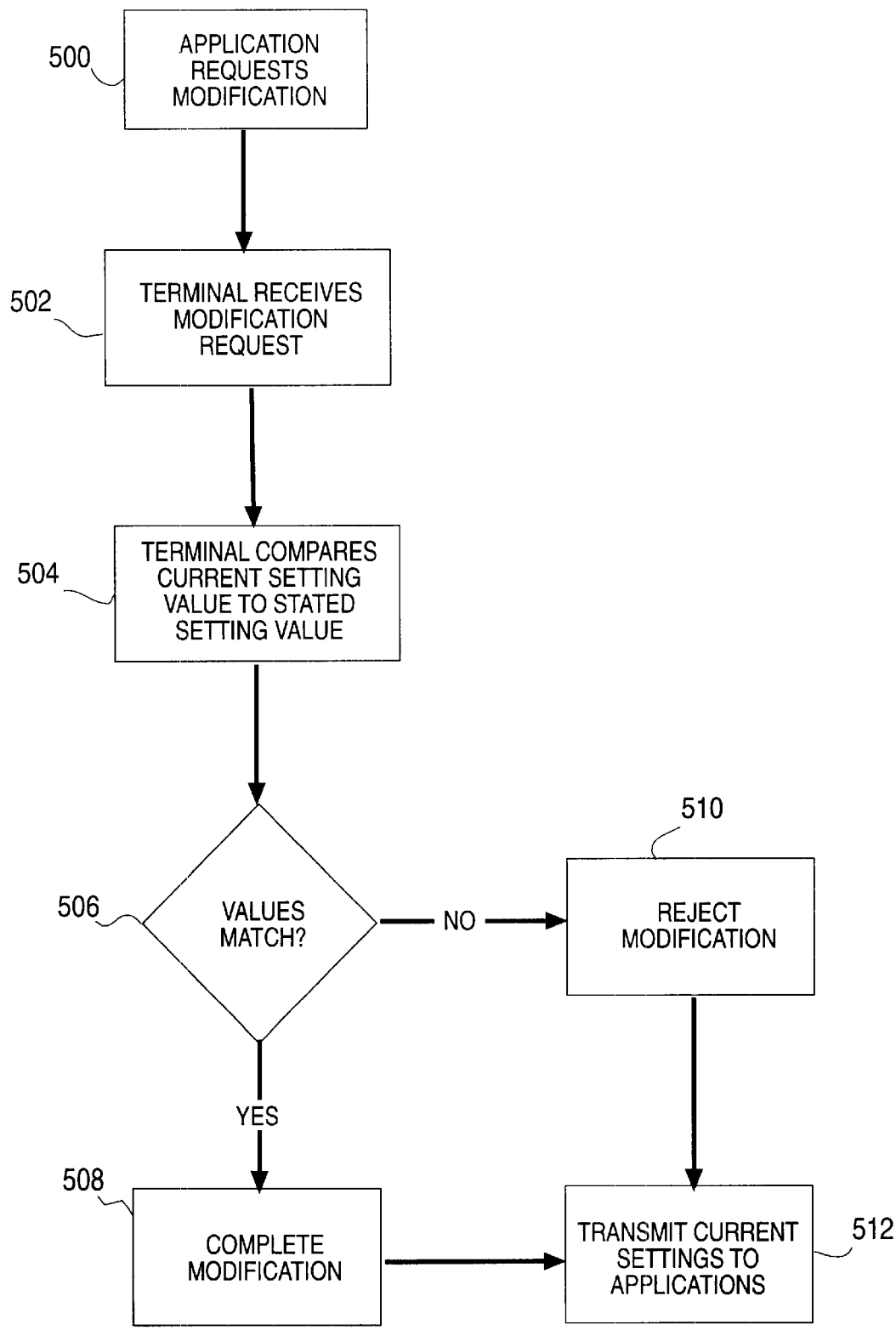
FIG. 5 illustrates a locking algorithm in accordance with one or more embodiments of the invention.

FIG. 5 illustrates the locking algorithm in accordance with one or more embodiments of the invention. At step 500, an application issues a request to modify a setting. At step 502, a terminal receives the modification request. At step 504, the terminal compares the current value of the setting to the stated value from the application. At step 506, the terminal determines if the values match. If the values do not match, the modification fails at step 510. If the values match, the modification is completed at step 508. Thus, an application knows the current setting value in order to execute a modification to the setting. In one or more embodiments, the current settings (whether modified or not) may be transmitted to the applications at step 512. In accordance with this algorithm, a race-condition exists such that the first application to request a change is successful. In this manner, the settings table 410 is locked while a setting is changed so that no other modifications may be completed prior to completion of the first application's modification requests. Further, the algorithm provides a solution in the event that an application requests a change to a setting before the application has had a chance to receive updated setting information from terminal 400.

Figure 6:
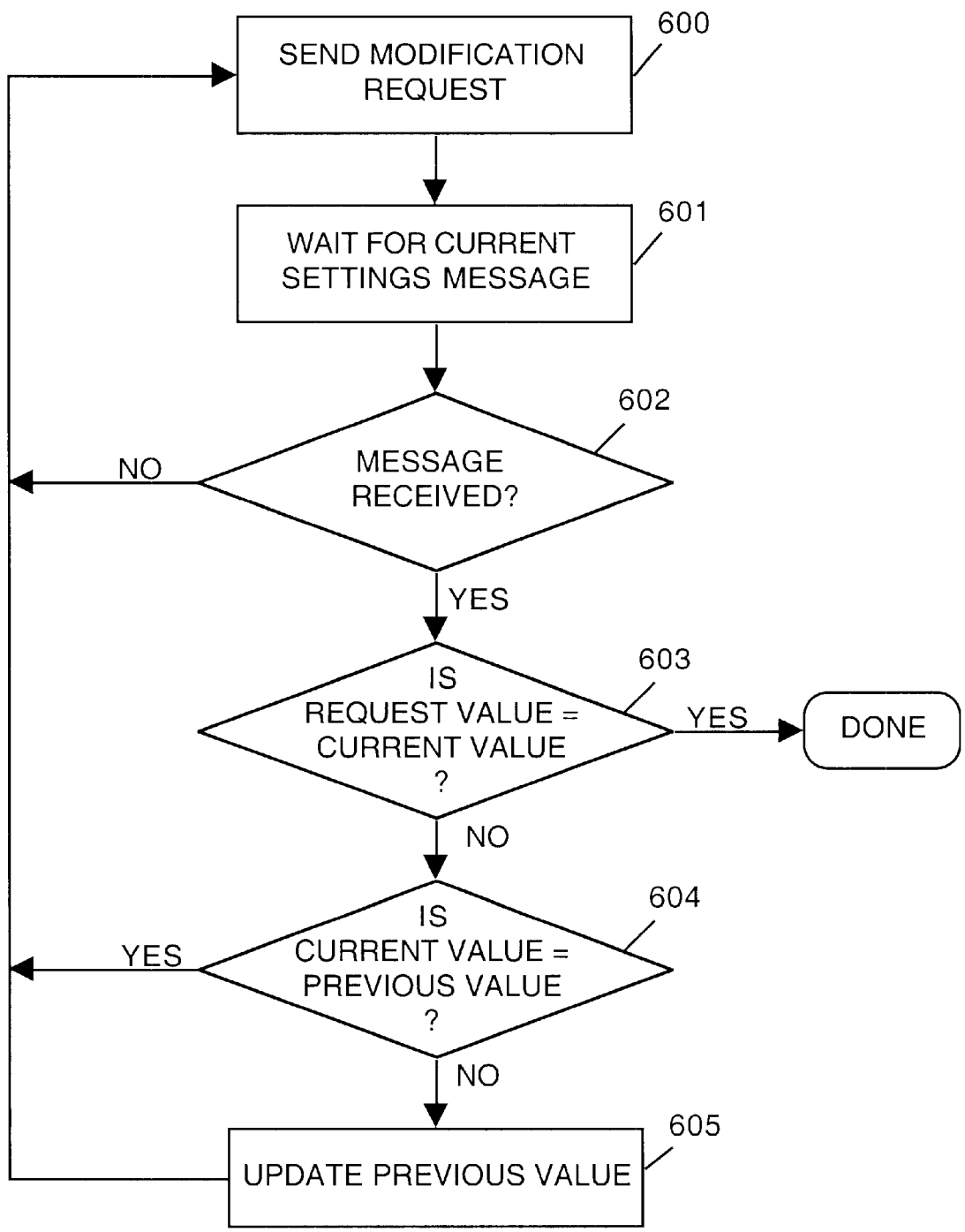
FIG. 6 illustrates the application flow for sending a modification request in accordance with an embodiment of the invention.

FIG. 6 is a flow diagram illustrating one possible mechanism for an application to send a modification request, in accordance with an embodiment of the invention. In step 600, an application sends a modification request to change one or more setting values, and in step 601, the application waits to receive a current settings message in response. In step 602, (e.g., after a specified length of time) if the application does not receive the current settings message, the application returns to step 600 to try again. Possible reasons for why the current settings message might not be received include, for example, the modification request was never successfully received, or the current settings response message was lost. If, in step 602, the current settings message is received by the application, the application proceeds to step 603 to evaluate the current settings message.

In step 603, if the request value is equal to the returned current value, then the request process is successfully completed. If, in step 603, the request value is not equal to the returned current settings value, the application proceeds to step 604. In step 604, if the returned current settings value is equal to the previous settings value, then the modification request was not received, and the application returns to step 600 to retry. If, in step 604, the returned current settings value is not equal to the previous settings value, then a race condition occurred (e.g., another application's modification request was received ahead of this application's modification request), and the application updates its own settings value in step 605 before returning to step 600 to retry. The number of times an application will retry a modification request is dependent upon the needs of the given application, and may differ for different embodiments.

(4) Mobility

In accordance with one or more embodiments of the invention, an user may disconnect from one terminal (e.g., by extracting an identification card/smartcard from a terminal or logging off) and reconnect to another terminal (e.g., by inserting an identification card/smartcard or logging on). The mobility property of the protocol provides that when a user switches a terminal, the user may elect to utilize the settings as previously configured are reinstated/used at the new terminal. Thus, the settings are mobile from one terminal to another terminal. Consequently, the mobility aspect provides that in addition to modifications occurring suddenly (e.g., by a user at a terminal modifying a setting), the terminal can change spontaneously (e.g., by a user unplugging from one terminal and plugging into a new terminal). Further, an user at a new terminal may be provided the option to utilize the settings as configured by the user that previously used the terminal. In one or more embodiments, the settings may be stored in the random access memory (RAM) of a terminal.

(5) Model Independence

One or more embodiments of the invention require that each terminal permits the settings to be adjusted independently from other terminals. For example, one terminal may not have a headphone output port or a different monitor from another terminal. Consequently, certain settings may not be possible on any one given terminal. Model independence permits each terminal to be adjusted depending on that particular terminal's characteristics.

One or more embodiments of the invention enable model independence by providing a character string in communications that identifies the model of the unit/terminal. For example, each message transmitted may be tagged with a terminal's version information and enables a terminal to dynamically load the settings into a settings library or a settings module using any programming language such as the Java™ programming language, for example. The terminal may then examine the loaded settings and determine if they are appropriate for the particular terminal (e.g., no headphone output or different monitor) (e.g., by comparing the loaded settings to permissible settings for that terminal). If certain settings are not permissible for the particular terminal model, the settings may be ignored or adjusted appropriately. Consequently, the settings between different versions of a terminal are controlled.

(6) Policy Free

One property is that the components of the system allow a user, a third party agent, a manufacturer, or other entity to set any desired policy related to the settings. In other words, setting policies may be set freely. A policy may be a computer program or list of rules and instructions regarding a configuration of settings based on a user, a terminal, network, or other standard. For example, a policy may provide for certain user settings that are user specific. Alternatively, a policy may provide for certain settings to be utilized on a network-wide basis or a terminal basis.

For example, if a user has poor eyesight, the protocol may permit the user to set a policy such that the display resolution follows the user from terminal to terminal and ignores any individual terminal settings as previously configured by prior users.

Alternatively, a user or application can set a policy that is complied with by everyone. For example, a company may desire and set a policy such that an energy saver routine (e.g., a routine the blanks a screen after a certain amount of time to conserve energy) is utilized by users with a certain time period specified.

Another type of policy permits a user to configure settings which may not be directly controlled by software but by hardware. For example, if headphones are not plugged into a computer, a user receives audio output from the terminal's speakers. However, a policy may be set to configure audio input/output when headphones are plugged into a terminal. For example, a policy may provide that when headphones are plugged into a terminal, the audio output should be directed solely to the headphones. Alternatively, a policy may provide that the speaker should be used with no output to the headphones or that when headphones are plugged in, audio output should be to both the headphones and the terminal's speaker.

A policy may also read a hardware setting and adjust any software controls as required. For example, if audio output is being controlled, a hardware switch may be utilized such that if the switch is configured to 00, the audio output is automatic (e.g., when headphones are plugged in, audio output switches to the headphones and when they are unplugged, audio output switches to a terminal's speaker), when the switch is configured to 01, only the speaker is utilized, when the switch is configured to 10, only headphones may be utilized to receive audio output, and when the switch is set to 11, both the headphones and speaker will receive audio output. One or more embodiments of the invention provide for a policy to read the configuration of the hardware switch and adjust any internal controls as necessary to accommodate the desired audio output. Further a policy may be utilized to adjust the switch depending on the situation. For example, if a telephone is being controlled, a policy may be set such that when headphones are plugged in a ring is only transmitted to a terminal's speakers (e.g., setting 01) and once the phone is answered, the audio output is set to automatic (e.g., setting 00) or is set to headphones only (e.g., setting 10).

(7) Report Hardware Events

One or more embodiments of the invention requires a terminal to notify applications of hardware events that may affect a setting. For example, if a head phone is unplugged from a terminal, the setting related to audio output may be affected. Should such an event occur, applications are notified of the change so that a setting may be adjusted appropriately.

(8) Read-only

In accordance with one or more embodiments of the invention, one or more settings may be configured such that they can only be read by an application or program and may not be modified. In this manner, a corporation or entity can configure a setting on a network wide basis such as specifying a certain time period for the execution of an energy saver on a terminal.

Implementation of Distributed Settings Control Protocol

The distributed settings control protocol provides the ability to control programs and settings over a network as described above. One or more embodiments enable a terminal, a unit, a peripheral, or a computer program (referred to as a "controlled program") to be controlled remotely over a network using a "controlling program" (e.g., an application executing on a server). The protocol may be split into two parts: a 'control' protocol that provides for the transmission from a controlling program to the controlled program and a protocol that provides for the transmission from the controlled program to the controlling program.

Control Protocol

In accordance with one or more embodiments of the invention, the control protocol transmits a list of tuples containing a number, or key, which identifies the setting based on a an old value, which should match the current value contained in the controlled program (as described above), and a new value, which is set if the old value matches (as described above). For example, the controlling program may transmit:

Device    Control    0xD8[<INDEX: 16><PAD:16><OLD:16><NEW:16>]

In accordance with one or more embodiments of the invention, such a transmission may set a specific value on the terminal. The above transmission identifies the particular terminal, identifies the setting on the terminal (i.e., the INDEX into the setting table), and specifies the old value and the new value. An additional value that specifies whether or not other settings should be modified at that same time may be attached to the end of the transmission. Such a value, if greater than zero (0) would be followed by additional indexes, old values, and new values. For example, a value of 2 may specify that two additional settings should be made at the same time as the first setting, and would be followed by two additional sets of indexes, old values, and new values.

Utilizing the test-and-set operation (as described above), the terminal requires the old values to be correct before the new value(s) are set. If multiple settings are in the command, old values should be correct before any settings are made. If the old values are not correct, then the command fails.

In one or more embodiments of the invention a "Device Control" command generates a "Device Status" message back to the requestor (e.g., server). If a requested modification fails, two cases may result: if the value returned is the same as the old value, then the setting may be read-only or lost; if the value returned is different than the old value, then a setting race (e.g., a race to modify a setting between different control programs) was lost and the requested modification should be retried. If a requested modification is successful, the requested new value may be returned in the "Device Status" message.

In one or more embodiments of the invention, if the server send a particular index (e.g., 0xffff), information regarding the model information is transmitted to the terminal without any setting changes.

Protocol from Terminal to Server

In accordance with one or more embodiments of the invention, the protocol provides for the terminal (or controlled program) to transmit information to the server (or controlling program). This protocol consists of a list of settings in order by key or number and their values. Additionally, a string may be sent that identifies the controlled program for the purpose of determining the meaning of the indexes which contract/policy the controlling program should follow. The transmission may also include a list of flags that indicate which settings are read-only with respect to this protocol (e.g., another mechanism may have determined that the setting is to be read-only either temporarily or permanently). For example, the following message may be transmitted:

Model Info 0xc6<SIZE:16>
<MODELLEN:8><MODEL:8[MODELLEN]>
<SETLEN:8>:<READONLY:1[SETLEN]>{<PAD:8>}
<SETTINGS:16[SETLEN]>{<PAD:16>}

Such a message may be returned in response to a "Device Control" message (described above) and is transmitted to the various services (e.g., applications and servers) who have sent device control messages so that applications and servers can update their setting information. To allow the entire message to be skipped easily, the above command starts with a byte length of the entire message, including the length field (i.e., SIZE:16).

The first part of the above message is the model name of the terminal. The model name may be specified in terms of a class package name (such as a Java class package name) which describes the vendor, the model name, and ends in the version information for the class package. For example, the following message illustrates a model name of a terminal:

com.sun.HID-P0:alpha3:atr or com.sun.HID-P1:alpha3:atr

The second part of the above message is the model-opaque sate information. There are a maximum of 255 possible settings. The number of settings may be followed by a bitmap of the read-only flags for each setting. For example, if a "1" is in the leftmost bit of the first byte, then the first parameter may be designated as read only. A pad evens out the byte count to an even 16-bit word (e.g., <PAD:8>).

The last part of the message is a list of 16-bit words that have the values of each indexed setting. The entire command is aligned to a longword.

Values sent by the terminal in the "Model Info" command are accepted by the terminal if they are later returned by a server in a "Device Control" message. Consequently, an unknowledgeable server is permitted to save and restore settings. By utilizing the above protocols, settings are consistent across multiple servers and may be modified while ensuring the changes are accurate and secure.

Thus, a distributed settings control protocol is described in conjunction with one or more specific embodiments. The invention is defined by the claims and their full scope of equivalents.

What is claimed is:

1. A method of configuring a setting across a network comprising:

providing computational services from a computational service provider to a user through a first terminal via a network;

providing a first setting on said first terminal;

obtaining a second setting and a third setting for said first terminal;

determining whether to utilize said third setting on a second terminal by matching said second setting with said first setting; and utilizing said third setting on said second terminal if said second setting matches said first setting.

2. The method of claim 1, further comprising replacing said first setting on said first terminal with said third setting if said second setting matches said first setting.

3. The method of claim 1, wherein a first application and a second application on said computational service provider have knowledge of said third setting if said second setting matches said first setting.

4. The method of claim 1, wherein said computational service provider comprises a first server and a second server.

5. The method of claim 4, wherein a first application is operating on said first server and a second application is operating on said second server.

6. The method of claim 5, wherein said first application and said second application maintain knowledge of said third setting even after said user has switched to said second terminal.

7. The method of claim 5, wherein said second setting and said third setting are provided from said first application via said network.

8. The method of claim 7, wherein said second application is informed of said third setting if said second setting matches said first setting.

9. The method of claim 7, further comprising informing said first application of said first setting if said second setting does not match said first setting.

10. The method of claim 7, further comprising:

rejecting said third setting if said second setting does not match said first setting; and informing said first application of said rejection.

11. The method of claim 10, wherein informing said first application of said rejection comprises informing said first application of said first setting.

12. The method of claim 4, wherein said third setting is obtained by said first server and said second server if said second setting matches said first setting.

13. The method of claim 1, wherein said first setting is stored in a setting table of said first terminal.

14. The method of claim 13, wherein said third setting is stored in said setting table if said determination is made to utilize said third setting.

15. The method of claim 1, wherein said setting is used for controlling a display.

16. The method of claim 1, wherein said setting is used for controlling audio output.

17. The method of claim 1, wherein said setting is used for controlling mouse acceleration.

18. A system comprising:

a network;

a first terminal connected with said network, said first terminal providing interface services to a user;

a first setting stored on said first terminal;

a second setting and a third setting provided to said first terminal via said network;

a server connected with said network and configured to determine whether to utilize said third setting on a second terminal, said server providing computational services to said user through said first terminal via said network; and a second terminal configured to utilize said third setting if said server determines to utilize said third setting.

19. The system of claim 18, wherein said server determines whether to utilize said second setting by matching said second setting with said first setting.

20. The system of claim 19, wherein said first setting on said first terminal is updated by said third setting if said second setting matches said first setting.

21. The system of claim 19, wherein said server further determines whether to utilize said third setting based on a policy.

22. The system of claim 21, wherein said policy is based on a user preference.

23. The system of claim 21, wherein said policy is based on a hardware of a terminal.

24. The system of claim 21, wherein said policy is based on a terminal location.

25. The system of claim 21, wherein said policy is based on a configuration of a network.

26. The system of claim 18, further comprising an application operating on said server and wherein said second setting and said third setting are provided from said application via said network.

27. The system of claim 26, wherein said application comprises a controlling program executing on said server and wherein said first terminal is remotely controlled over said network by said controlling program.

28. The system of claim 26, further comprising:

a second server connected with said network; and a second application operating on said second server, wherein said second application is informed of said third setting if said second setting matches said first setting.

29. The system of claim 26, further comprising:

a second server connected with said network;

a second application operating on said second server; and a fourth setting provided to said first terminal from said second application via said network.

30. The system of claim 29, wherein said server determines to utilize said third setting if said second setting is provided to said first terminal before said fourth setting.

31. The system of claim 29, wherein said second application on said second server is informed of said third setting if said second setting is provided to said first terminal before said fourth setting.

32. The system of claim 18, further comprising:

a second server connected with said network;

a first application operating on said server; and a second application operating on said second server;

wherein said first application and said second application have knowledge of said third setting; and wherein said second setting and said third setting are provided from said second application.

33. A method of configuring a setting across a network comprising:

providing computational services from a computational service provider to a user through a first terminal via a network;

providing a first setting on said first terminal;

obtaining a second setting and a third setting for said first terminal via said network;

determining whether to update said third setting on said first terminal by matching said second setting with said first setting;

updating said first setting on said first terminal if said second setting matches said first setting;

determining whether to utilize said third setting on a second terminal; and utilizing said third setting on said second terminal, if a determination is made to utilize said third setting.

34. The method of claim 33, wherein said determining whether to utilize said third setting is based on a policy.

35. The method of claim 34, wherein said policy comprises one of a user preference policy, a terminal hardware policy, a terminal location policy, and a network policy.

36. The method of claim 33, wherein a plurality of applications operating on said computation service provider have knowledge of said third setting if said second setting matches said first setting.

37. The method of claim 33, wherein said computational service provider comprises a plurality of servers and wherein said plurality of servers are informed of said third setting if said first terminal has been updated with said third setting.

\* \* \* \* \*